United States Patent [19]

Shutt

[11] Patent Number: 5,108,481
[45] Date of Patent: Apr. 28, 1992

[54] PELLETIZED FERROUS SULFATE MONOHYDRATE PRODUCT AND METHOD FOR MAKING THE SAME

[75] Inventor: Thomas C. Shutt, Denver, Colo.

[73] Assignee: Vista Ferrous Sulfate, Ltd., Denver, Colo.

[21] Appl. No.: 654,871

[22] Filed: Feb. 13, 1991

[51] Int. Cl.$^5$ .......................... B29C 9/08; C01G 49/14
[52] U.S. Cl. ........................................ 71/61; 23/313 P; 71/63; 71/64.05; 264/117; 423/558
[58] Field of Search ................. 264/15, 117; 71/64.05, 71/64.13, 63, 61; 423/274, 558; 23/313 P

[56] References Cited

U.S. PATENT DOCUMENTS

| | | | |
|---|---|---|---|
| 2,813,014 | 11/1957 | Allison et al. | 71/63 |
| 3,748,115 | 7/1973 | Sommer et al. | 71/64.11 |
| 3,963,118 | 6/1976 | Ferguson | 71/63 |
| 3,964,893 | 6/1976 | Everingham et al. | 71/65 |
| 4,058,389 | 11/1977 | Piccolo et al. | 71/63 |
| 4,071,347 | 1/1978 | Piccolo et al. | 71/63 |
| 4,157,371 | 6/1979 | Paulson et al. | 264/114 |
| 4,339,402 | 7/1982 | Henry | 264/40.1 |
| 4,659,557 | 4/1987 | Lenz et al. | 423/558 |

FOREIGN PATENT DOCUMENTS

| | | | |
|---|---|---|---|
| 93204 | 11/1983 | European Pat. Off. | 71/63 |
| 2461518 | 3/1981 | France | 71/63 |
| 54-133500 | 10/1979 | Japan | 423/558 |

Primary Examiner—Mary Lynn Theisen
Attorney, Agent, or Firm—Klaas & Law

[57] ABSTRACT

A pelletized ferrous sulfate monohydrate ($FeSO_4 \cdot H_2O$) product and method for the manufacture thereof. Hard, spherical ferrous sulfate monohydrate pellets are manufactured by combining ferrous sulfate monohydrate powder with an aqueous solution of ammonium sulfate $(NH_4)_2SO_4$ having a preferred concentration of about 1–40% by weight ammonium sulfate. Mixture of these components occurs in a conventional pelletizing apparatus (e.g. a disc pelletizer) which produces individual pellets from the components. The pellets are then heated in order to remove excess water therefrom. The foregoing process enables durable pellets to be made without substantial hydration of the ferrous sulfate monohydrate. The pellets are spherical, have a size of about $-6+20$ U.S. standard mesh, and have not less than about 25% by weight soluble Fe.

19 Claims, 1 Drawing Sheet

PELLETIZED FERROUS SULFATE MONOHYDRATE PRODUCT AND METHOD FOR MAKING THE SAME

BACKGROUND OF THE INVENTION

The present invention generally relates to the production of a pelletized chemical product, and more particularly to the production of durable ferrous sulfate monohydrate pellets having a desired size, shape, and composition.

There are four principal forms of ferrous sulfate, all of which have different waters of crystallization associated therewith. These forms are as follows:

1) $FeSO_4 \cdot 7H_2O$
2) $FeSO_4 \cdot 4H_2O$
3) $FeSO_4 \cdot H_2O$
4) $FeSO_4$ (anhydrous)

$FeSO_4 \cdot 7H_2O$ is unstable and converts spontaneously under atmospheric temperature, pressure, and humidity conditions to $FeSO_4 \cdot 4H_2O$. $FeSO_4 \cdot 4H_2O$ converts to $FeSO_4 \cdot H_2O$ upon the application of heat (e.g. at temperatures above 64 degrees C). $FeSO_4 \cdot H_2O$ is a stable product, and will not hydrate in the atmosphere. Finally, $FeSO_4$ (anhydrous) is a manufactured product, and does not exist in nature unlike the other compositions listed above. All forms of ferrous sulfate are highly soluble in water, generating an acidic pH of about 3–4.

There are two basic sources of ferrous sulfate. First, a substantial amount of ferrous sulfate exists naturally, primarily in regions of the world which are volcanic or have large deposits of sulfur-containing minerals. Natural ferrous sulfate (e.g. $FeSO_4 \cdot 7H_2O$) does not exist in large quantities, and is not used substantially for commercial purposes. The second major source of ferrous sulfate involves the production thereof as a by-product of heavy industry. Hundreds of thousands of tons of ferrous sulfate (primarily $FeSO_4 \cdot 7H_2O$) are generated in the world annually. In 1990, the United States generated approximately 100,000 tons of ferrous sulfate as chemical by-products of industry, primarily in accordance with the following reaction:

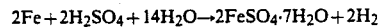

$$2Fe + 2H_2SO_4 + 14H_2O \rightarrow 2FeSO_4 \cdot 7H_2O + 2H_2$$

The foregoing reaction typically occurs in the steel industry during the cleaning of steel items with sulfuric acid ($H_2SO_4$). This process (commonly known as "pickling") is used to clean steel products including wire, nails, fencing, and the like prior to galvanizing or coating with protective oils/plastics. The $FeSO_4 \cdot 7H_2O$ which is produced from this process typically consists of crystals which are about 20–40 mesh in size and surface coated with about 0.5 –1.0% by weight $H_2SO_4$ and about 2.0–4.0% by weight water. Although the resulting ferrous sulfate is currently characterized as a hazardous waste by the United States Environmental Protection Agency, much of it has been dumped indiscriminately regardless of adverse environmental consequences.

However, in recent years, much of the waste ferrous sulfate (e.g. $FeSO_4 \cdot 7H_2O$) is being collected and used commercially in the production of $Fe_2O_3$, and in various other applications.

It has also been determined that $FeSO_4 \cdot H_2O$ (hereinafter "ferrous sulfate monohydrate") has considerable value as both an animal feed supplement (providing a substantial source of Fe) and as a micronutrient fertilizer for agricultural purposes. Ferrous sulfate monohydrate is conventionally obtained by heating either $FeSO_4 \cdot 7H_2O$ or $FeSO_4 \cdot 4H_2O$ at a temperature of above about 64 degrees C. Since the waters of crystallization in these materials are part of their molecular structures, the resulting ferrous sulfate monohydrate is reduced in size to a fine powder (e.g. not exceeding about −325 U.S. standard mesh or 44 microns) which is easily air-dispersed and has a low bulk-density. The ferrous sulfate in this form is suitable for use as an animal feed supplement, but will not function effectively as a plant supplement due to its small particle size. Instead, tests have shown that ferrous sulfate monohydrate is most effective for agricultural purposes when it is delivered in the form of a particle or pellet having a size of about −6+20 U.S. standard mesh. Pellets of this size enable a controlled distribution of nutrients into the soil, compared with powders (which disperse into the soil too rapidly) and larger pellets (which disperse too slowly).

Of the two uses for ferrous sulfate monohydrate listed above, agricultural applications are of primary importance. From a chemical perspective, ferrous sulfate monohydrate is an important source of soluble Fe. Accordingly, it will dissolve readily in water (e.g. rainwater), and is rapidly dispersed into the soil where it is thereafter drawn into plant root systems. Most soil materials west of the Mississippi river in the United States are soluble Fe-deficient, thereby creating a substantial need for Fe-based supplements such as ferrous sulfate monohydrate. In the northwestern parts of the United States, ferrous sulfate monohydrate may be used as a moss-control agent in view of its acidic pH. In citrus-growing regions of the United States, ferrous sulfate monohydrate may also be used to fertilize citrus trees which require substantial amounts of soluble Fe. For the purposes of this invention, the term "soluble Fe" shall be defined herein as amount of Fe by weight in a water-soluble Fe compound or composition. For example, ferrous sulfate monohydrate (a water-soluble Fe compound) has a theoretical Fe content of 32.9%, all of which is deliverable when used as a plant nutrient since the ferrous sulfate monohydrate is entirely water-soluble. In a ferrous sulfate monohydrate-containing particle/pellet, the % of soluble Fe therein would first involve 1) how much Fe (wt. %) is in the ferrous sulfate monohydrate (theoretically 32.9%) and 2) the amount of other ingredients in the particle/pellet which would correspondingly reduce the wt. % of Fe therein to a lower number. Normally, the amount of soluble Fe is readily determined by conventional chemical analytical techniques known in the art.

As noted above, it is desired that agricultural ferrous sulfate monohydrate have a particle/pellet size of about −6+20 U.S. standard mesh. In addition, it is also important that the particle/pellet have a spherical shape. The spherical shape and uniform size assist in maintaining a homogeneous mixture of materials in commercial packages of plant nutrients. This may not occur when non-uniform, nonspherical particles/pellets are used, thereby resulting in improper dispersion of nutrients during fertilizer application.

Furthermore, ferrous sulfate monohydrate pellets produced in accordance with the present invention should have no less than about 25% by weight soluble Fe, although an optimum soluble Fe concentration would be about 30% by weight or more. Soluble Fe concentrations less than about 25% may prevent efficient Fe delivery and utilization by plant systems.

To accomplish these goals, it is desired that ferrous sulfate monohydrate be produced in pellet form wherein each pellet has a size of about −6+20 U.S. standard mesh and is in prill (e.g spherical) form. The pellets must also be sufficiently hard to avoid crumbling during transport. Crumbling or breakage of the pellets will again prevent a homogeneous mixture of materials from being maintained.

The United States currently uses about 60,000–80,000 tons of ferrous sulfate monohydrate annually. Japan supplies about 70% of this amount. The rest is obtained domestically and from Korea and/or Mexico. However, the best available ferrous sulfate monohydrate from commercial sources is cubic in form rather than spherical, and of insufficient hardness. Cubic ferrous sulfate monohydrate particles are produced as a result of conventional production methods in which sheets of ferrous sulfate monohydrate are produced by drying $FeSO_4 \cdot 7H_2O$ to obtain ferrous sulfate monohydrate powder, and compressing the powder into loosely-bound sheets (e.g. by vacuum hot-pressing procedures known in the art) which are readily crushed and thereafter screened. This produces a product which does not blend well, and includes sharp pointed regions which are easily abraded, thereby producing an undesirable powder. Thus, a substantial need currently exists for a ferrous sulfate monohydrate pellet product which is spherical, has a particle size of about −6+20 U.S. standard mesh, has a soluble Fe level of not less than about 25% by weight, is readily manufactured, and is sufficiently durable to prevent breakage during transport. The present invention satisfies these needs in a new and unique manner, as described herein.

SUMMARY OF THE INVENTION

It is an object of the present invention to provide a ferrous sulfate monohydrate product which is suitable for agricultural use.

It is another object of the invention to provide a ferrous sulfate monohydrate product in the form of a pellet which is spherically shaped.

It is another object of the invention to provide a ferrous sulfate monohydrate pellet which is sufficiently hard to prevent breakage thereof during transport.

It is another object of the invention to provide a ferrous sulfate monohydrate pellet which has a particle size of about −6+20 U.S. standard mesh.

It is another object of the invention to provide a ferrous sulfate monohydrate pellet which has a soluble Fe content of not less than about 25% by weight.

It is a further object of the invention to provide a method for manufacturing a ferrous sulfate monohydrate pellet having the characteristics listed in the foregoing objects.

It is a still further object of the invention to provide a method for manufacturing a ferrous sulfate monohydrate pellet which involves a minimal number of production steps.

It is a still further object of the invention to provide a method for manufacturing a ferrous sulfate monohydrate pellet which is readily implemented on a mass production scale.

It is an even further object of the invention to provide a method for manufacturing a ferrous sulfate monohydrate pellet which avoids substantial hydration of the ferrous sulfate monohydrate during the pelletization process.

In accordance with the foregoing objects, ferrous sulfate monohydrate pellets and a method for the manufacture thereof are disclosed. Specifically, hard, spherical ferrous sulfate monohydrate pellets are manufactured by combining ferrous sulfate monohydrate powder with an aqueous solution of $(NH_4)_2SO_4$ (hereinafter "ammonium sulfate"). The ammonium sulfate solution has a concentration level of about 1–40% by weight ammonium sulfate (preferred=about 15–40% by weight and optimum=about 20% by weight). These components are mixed in a conventional pelletizing apparatus (e.g. a disc pelletizer known in the art) which produces individual pellets from the components. The ammonium sulfate solution serves as a binder for the ferrous sulfate monohydrate. However, even though the ammonium sulfate is in an aqueous solution, the unique characteristics and interactions of the components described herein prevents additional hydration of the ferrous sulfate monohydrate structure. The resulting pellets are then heated in order to remove excess moisture therefrom. The foregoing process enables durable pellets to be made without additional hydration of the ferrous sulfate monohydrate as noted above. The final pellets are spherical, have a size of about −6+20 U.S. standard mesh, and have not less than about 25% by weight soluble Fe therein.

These and other objects, features, and advantages of the invention shall be described below in the following Detailed Description of Preferred Embodiments and Brief Description of the Drawing.

BRIEF DESCRIPTION OF THE DRAWING

Illustrative and presently preferred embodiments of the invention are shown in the accompanying drawing in which.

DETAILED DESCRIPTION OF PREFERRED EMBODIMENTS

Figure 1:
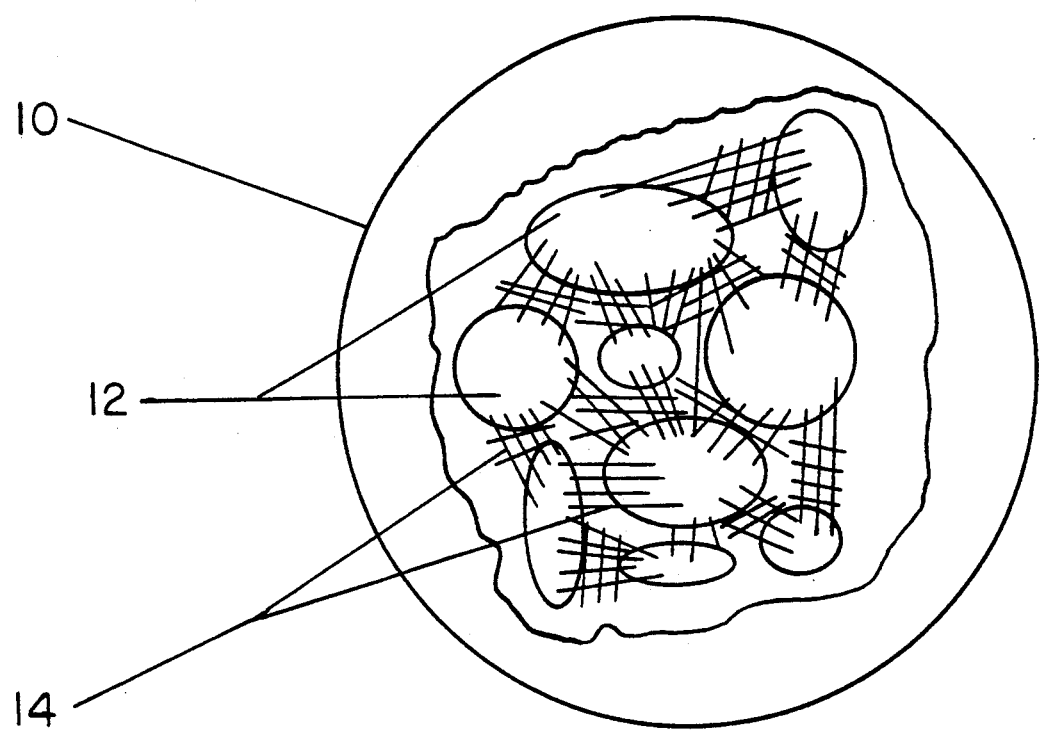
FIG. 1 is a schematic illustration of a ferrous sulfate monohydrate pellet produced in accordance with the present invention having a portion thereof broken away in order to show individual ferrous sulfate monohydrate particles bound together with ammonium sulfate crystals. The ferrous sulfate monohydrate particles and ammonium sulfate crystals are enlarged for purposes of illustration.

The present invention involves a durable ferrous sulfate monohydrate pellet product and method for making the same. As previously noted, ferrous sulfate monohydrate is a highly beneficial plant nutrient. However, it is important that the ferrous sulfate monohydrate be delivered in a form which is durable, uniform, and of a specified size. To accomplish this, it is preferred that spherical pellets be produced which minimize breakage and enable a homogenous mixture of components to be maintained in product packages during transport. Current commercial forms of the product are non-spherical, and primarily consist of angular particle agglomerations.

However, the pelletization of ferrous sulfate monohydrate presents numerous problems. Traditional pelletizing processes involve the combination of dry powdered starting materials with the spray application of an aqueous binder (e.g. water) in a rotating, angularly-disposed receptacle (e.g. a pan). This causes the powder to agglomerate and form small balls or pellets in the rotating receptacle. These procedures are conventional, and described in Engelleitner, W.H., "Selection of the Proper Agglomeration Process", *Powder and Bulk Solids*, pp. 2-5 (May 1985), which is incorporated herein by reference.

However, this procedure presents significant problems with respect to the pelletizing of ferrous sulfate monohydrate. Primarily, conventional aqueous binders (especially water) will hydrate the ferrous sulfate monohydrate and convert it to $FeSO_4 \cdot 7H_2O$. As previously indicated, the pellet should have a size of about $-6+20$ U.S. standard mesh and contain not less than about 25% by weight soluble Fe in order to be an agriculturally effective product. If the ferrous sulfate monohydrate were converted (hydrated) to $FeSO_4 \cdot 7H_2O$, the resulting pellet would only contain about 19% soluble Fe which is unacceptably low. This occurs because commercially-available ferrous sulfate monohydrate has a soluble Fe content of about 31-32% (theoretical=32.9%) while $FeSO_4 \cdot 7H_2O$ has a soluble Fe content of only about 20%. In addition, if the hydrated pellet was sufficiently dried in order to convert $FeSO_4 \cdot 7H_2O$ back to ferrous sulfate monohydrate, tests have conclusively shown that the converted product has no structural integrity and turns to powder. Thus, it is critical that hydration of the ferrous sulfate monohydrate be prevented from the outset during the pelletization process.

Furthermore, if non-aqueous binders (e.g. alcohols) were used which would not hydrate the ferrous sulfate monohydrate but would chemically evaporate more rapidly than water, the pellet would ultimately turn to powder. This would occur because an insufficient amount of binder would be present to maintain pellet structural integrity.

The present invention solves the above problems and enables the production of correctly-sized ferrous sulfate monohydrate pellets without hydration problems. To produce spherical ferrous sulfate monohydrate pellets in accordance with the present invention, a supply of powdered ferrous sulfate monohydrate is first obtained. This material typically has a very small particle size (e.g. not exceeding about $-325$ U.S. standard mesh or 44 microns), is easily air-dispersed, and has a low bulk density. It is commercially available from a variety of sources, including but not limited to the J.H. Huber Co. of Quincy, Ill. In the alternative, ferrous sulfate monohydrate may be readily manufactured from $FeSO_4 \cdot 7H_2O$ by heating thereof at temperatures above 64 degrees C. over a time period of about 2 minutes or more, depending on the amount of $FeSO_4 \cdot 7H_2O$ being heated. A specific source of $FeSO_4 \cdot 7H_2O$ is the C.F. & I. Company of Pueblo, Colo.

The powdered ferrous sulfate monohydrate is then placed in the receptacle of a pelletizing apparatus known in the art (preferably a standard disc pelletizer). Disc pelletizers use a mixing pan which includes a plurality of disc members which assist in mixing of the materials in the pan. The upward angle of the pan is selectively variable, and typically ranges from about 15-60 degrees upward from the horizontal in most commercial units. The pan is rotatable using a motor drive system, preferably at a speed of about 10-40 RPM. One or more spray lines are operatively connected to the pelletizer unit which deliver liquid binder materials to the dry materials in the pan as described below. The liquid binder materials may be delivered from external pressure tanks, or from a pump-driven liquid storage tank. The spraying pressure should be maintained at a controlled level of ideally not less than about 40 psi.

A commercially available disc pelletizer unit suitable for use with the present invention is manufactured by Teledyne Readco, Inc. of York, Pa. (having a 3 ft. diameter circular stainless steel mixing pan—Model No. TR-3). However, the present invention shall not be limited to any specific pelletizing systems, and a wide variety of other systems known in the art may be used, including conventional pellet press units and the like.

As described above, two important factors in the operation of disc pelletizer units involve: (1) the upward tilt angle of the pan; and (2) the rotational speed of the pan. Lower pan angles and lower rotational speeds produce larger pellets. In the present process using the specific commercial disc pelletizer recited above, it is preferred that the pan be positioned at an upward angle of about 30-40 degrees (about 35 degrees=optimum) and be rotated at about 18-28 rpm (about 20 rpm=optimum). However, these values may be suitably modified, depending on the type of pelletizing system used and its general capacity.

During rotation of the powdered ferrous sulfate monohydrate, an aqueous binder solution consisting of ammonium sulfate in water is sprayed onto the ferrous sulfate monohydrate powder in order to form a mixture of the ferrous sulfate monohydrate powder and binder solution. The binder solution of the present invention preferably has a concentration of about 1-40% by weight ammonium sulfate (about 15-40% by weight ammonium sulfate=preferred, with about 20% by weight=optimum). The droplet size, spray pressure, and number of spray nozzles to be used are all conventionally determined, depending on the type of pelletizing system being used. In general, about 1-2 spray nozzles are used, each nozzle delivering droplets having a size of about 60-140 U.S. standard mesh (about 100 U.S. standard mesh=optimum) at a pressure of about 40-200 psi (about 100 psi=optimum).

As the ammonium sulfate binder solution is applied, it agglomerates the ferrous sulfate monohydrate powder, causing small spherical balls (e.g. pellets) to be formed. It should be noted that total amount of ammonium sulfate binder solution used in the present process should equal about 12-30% by weight (about 12-20% by weight=optimum) of the pelletized product after completion and prior to drying as described below. In other words, the completed "wet" pellets prior to drying should contain about 12-30% by weight ammonium sulfate solution (about 12-20%=optimum). Furthermore, it is preferred that the ferrous sulfate monohydrate and binder solution be combined in a ferrous sulfate monohydrate powder:binder solution weight ratio of about 9:1 to 7:3 (about 4:1=optimum).

Also, the pelletizer unit should be suitably adjusted to produce spherical pellets having an individual size of about $-6+20$ U.S. standard mesh for the reasons described above. This is conventionally accomplished in a disc pelletizer by properly adjusting the pan angle, pan rotation speed, and amount of binder liquid which is used. Again, each different pelletizing system will require individual adjustments to the pan angle, pan rotation speed and amount of liquid being used. However, for the commercial system described herein, all of the foregoing parameters necessary to produce $-6+20$ pellets have been listed above.

The pellets are then removed from the pelletizer unit and dried in order to remove excess moisture therefrom.

This is typically accomplished through the application of heat in a heated air fluid bed drier known in the art or other conventional heating apparatus. In a preferred embodiment, drying is accomplished by heating the pellets at a temperature of about 65-100 degrees C. for about 6-20 minutes.

The completed pellets are spherical and each have size of about −6+20 U.S. standard mesh. They each contain about 85-97% by weight ferrous sulfate monohydrate and about 3-15% by weight ammonium sulfate crystals. The following Examples illustrate −6+20 pellet products produced using the foregoing methods in which selected operational parameters are varied. All of the Examples involve the use of a Teledyne Readco, Inc., Model TR-3, disc pelletizer as described above.

EXAMPLE 1

The following operational parameters were used in this Example:
1) Pan speed = 20 RPM
2) Pan angle = 40 degrees
3) Ammonium sulfate solution conc. = 40% (by wt.)
4) Weight ratio of ferrous sulfate = 70:30 monohydrate to ammonium sulfate binder solution The resulting pellets (after drying) had the following average characteristics:
A) % by weight ferrous sulfate monohydrate = 85.4
B) % by weight ammonium sulfate = 14.6
C) % by weight soluble Fe = 27.5
D) quality of pellet = hard

EXAMPLE 2

The following operational parameters were used in this Example:
1) Pan speed = 24 RPM
2) Pan angle = 32 degrees
3) Ammonium sulfate solution conc. = 30% (by wt.)
4) Weight ratio of ferrous sulfate = 78:22 monohydrate to ammonium sulfate binder solution The resulting pellets (after drying) had the following average characteristics:
A) % by weight ferrous sulfate monohydrate = 92.2
B) % by weight ammonium sulfate = 7.8
C) % by weight soluble Fe = 29.6
D) quality of pellet = hard

EXAMPLE 3

The following operational parameters were used in this Example:
1) Pan speed = 23 RPM
2) Pan angle = 40 degrees
3) Ammonium sulfate solution conc. = 20% (by wt.)
4) Weight ratio of ferrous sulfate = 80:20 monohydrate to ammonium sulfate binder solution The resulting pellets (after drying) had the following average characteristics:
A) % by weight ferrous sulfate monohydrate = 95.2
B) % by weight ammonium sulfate = 4.8
D) quality of pellet = hard

EXAMPLE 4

The following operational parameters were used in this Example:
1) Pan speed = 20 RPM
2) Pan angle = 35 degrees
3) Ammonium sulfate solution conc. = 0% (by wt.)
4) Weight ratio of ferrous sulfate = 79:21 monohydrate to solution (entirely water)

The product (after drying) had the following average characteristics:
A) % by weight ferrous sulfate monohydrate = 100
B) % by weight ammonium sulfate = 0
C) % by weight soluble Fe = 32.1
D) quality of pellet = pellet turned to powder after drying Example 4 involved a "control" test which did not utilize any ammonium sulfate. Complete hydration of the ferrous sulfate monohydrate occurred during pelletization. Upon drying, the hydrated product was converted back into ferrous sulfate monohydrate, wherein the pellet turned to powder.

The best results were achieved in Example 3 which produced a pellet having a soluble Fe content of 30.8%. This was accomplished using a 20% ammonium sulfate binder solution, which was designated herein as being optimum. Good results were also achieved in Example 2 wherein a pellet was produced having a soluble Fe content of 29.6%.

Finally, adequate results were achieved in Example 1, although the soluble Fe content of the pellet was slightly lower than the optimum value of 30% soluble Fe.

It should also be noted that the pellet products of Examples 1-3 were all totally soluble in water.

The use of an aqueous solution of ammonium sulfate functions in a highly effective manner as a binder for powdered ferrous sulfate monohydrate. Notwithstanding the presence of water in the binder solution described herein, substantially no hydration of the ferrous sulfate monohydrate occurs. This unexpected result occurs as a result of complex interactions between all of the components discussed herein which are the subject of current research, but are not yet fully understood.

With reference to FIG. 1, an enlarged, schematic partial view of the interior of a ferrous sulfate monohydrate pellet 10 produced in accordance with the invention is illustrated. Binding of the ferrous sulfate monohydrate powder particles 12 together is accomplished by the adhesion of ammonium sulfate crystals 14 thereto. More specifically, the ammonium sulfate crystals 14 function as interconnective binding units between adjacent particles 12 as illustrated. The crystals 14 form during the drying stage described herein. Ammonium sulfate is orthorhombic and forms crystalline needle structures as illustrated. It is also theorized that some of the ammonium sulfate crystals 14 adhere to each other in an interlocking arrangement, as illustrated in FIG. 1. This further enhances the structural integrity of the pellet 10.

As noted above, the resulting pellets are entirely spherical, have a size of about −6+20 U.S. standard mesh, and have a soluble Fe content of not less than about 25% by weight. The pellets are unexpected hard, with substantially no hydration of the ferrous sulfate monohydrate therein. Furthermore, the ammonium sulfate crystals in the pellets are non-toxic to the environment. Thus, the present invention as described herein represents an advance in the art of micronutrient (ferrous sulfate monohydrate) pelletization for agricultural purposes.

Having herein described preferred embodiments of the present invention, it is anticipated that suitable modifications may be thereto within the scope of the invention. For example, various production parameters may be suitably varied, including but not limited to the type of pelletizing apparatus being used, the drying equipment and procedures involved, and the like. Thus, the present invention shall only be construed in accordance with the following claims:

I claim:

1. A method for manufacturing pelletized $FeSO_4 \cdot H_2O$ comprising the steps of:
   providing a supply of $FeSO_4 \cdot H_2O$ powder;
   combining said supply of $FeSO_4 \cdot H_2O$ powder with a binder solution comprising $(NH_4)_2SO_4$, said binder solution being added in an amount sufficient to produce a mixture comprising an agglomeration of said $FeSO_4 \cdot H_2O$ powder adhered together by said binder solution;
   forming a plurality of individual pellets from said mixture; and
   drying said pellets in an amount sufficient to remove any excess water therefrom, said drying of said pellets causing the hardening thereof, said pellets comprising $FeSO_4 \cdot H_2O$ therein.

2. The method of claim 1 wherein said binder solution comprises about 15-40% by weight $(NH_4)_2SO_4$.

3. The method of claim 1 wherein said forming of said plurality of said individual pellets comprises the steps of:
   providing a pelletizing apparatus having said mixture therein; and
   activating said pelletizing apparatus in order to form said pellets from said mixture.

4. The method of claim 3 wherein said pelletizing apparatus comprises a disc pelletizer unit.

5. The method of claim 1 wherein said pellets are each spherical in shape and have a size of about −6+20 U.S. standard mesh.

6. The method of claim 1 wherein each of said pellets comprises not less than about 25% by weight soluble Fe.

7. The method of claim 1 wherein said drying of said pellets comprises the step of applying heat thereto in an amount sufficient to remove said excess water therefrom.

8. The method of claim 7 wherein said applying of said heat comprises the step of heating said pellets at a temperature of about 65-100 degrees C. for about 6-20 minutes.

9. The method of claim 1 wherein said $FeSO_4 \cdot H_2O$ powder and said binder solution are combined in a $FeSO_4 \cdot H_2O$ powder:binder solution weight ratio of about 9:1 to 7:3 in order to form said mixture.

10. The product of the method of claim 1.

11. A method for manufacturing pelletized $FeSO_4 \cdot H_2O$ comprising the steps of:
    providing a pelletizing apparatus;
    providing a supply of $FeSO_4 \cdot H_2O$ powder;
    combining said supply of $FeSO_4 \cdot H_2O$ powder with a binder solution comprising $(NH_4)_2SO_4$ in said pelletizing apparatus, said $FeSO_4 \cdot H_2O$ powder and said binder solution being combined in a $FeSO_4 \cdot H_2O$ powder:binder solution weight ratio of about 9:1 to 7:3 in order to produce a mixture comprising an agglomeration of said $FeSO_4 \cdot H_2O$ powder adhered together by said binder solution;
    activating said pelletizing apparatus in order to form a plurality of individual pellets from said mixture; and
    applying heat to said pellets in an amount sufficient to remove any excess water therefrom, said applying of said heat to said pellets causing the hardening thereof, said pellets comprising $FeSO_4 \cdot H_2O$ therein.

12. The method of claim 11 wherein said binder solution comprises about 15-40% by weight $(NH_4)_2SO_4$.

13. The method of claim 11 wherein said pelletizing apparatus comprises a disc pelletizer unit.

14. The method of claim 11 wherein said pellets are each spherical in shape and have a size of about −6+20 U.S. standard mesh.

15. The method of claim 11 wherein each of said pellets comprises not less than about 25% by weight soluble Fe.

16. The method of claim 11 wherein said applying of said heat comprises the step of heating said pellets at a temperature of about 65-100 degrees C. for about 6-20 minutes.

17. The product of the method of claim 11.

18. A method for manufacturing pelletizing $FeSO_4 \cdot H_2O$ comprising the steps of:
    providing a disc pelletizer unit;
    providing a supply of $FeSO_4 \cdot H_2O$ powder;
    combining said supply of $FeSO_4 \cdot H_2O$ powder with a binder solution comprising about 15-40% by weight $(NH_4)_2SO_4$ in said pelletizer unit in order to produce a mixture comprising an agglomeration of said $FeSO_4 \cdot H_2O$ powder adhered together by said binder solution, said $FeSO_4 \cdot H_2O$ powder and said binder solution being combined in a $FeSO_4 \cdot H_2O$ powder:binder solution weight ratio of about 9:1 to 7:3 in order to form said mixture;
    activating said pelletizer unit in order to form a plurality of individual pellets from said mixture; and
    heating said pellets at a temperature of about 65-100 degrees C. for about 6-20 minutes in order to remove any excess water therefrom, said heating of said pellets causing the hardening thereof, each of said pellets being spherical, comprising $FeSO_4 \cdot H_2O$ therein, having a size of about −6+20 U.S. standard mesh, and comprising not less than about 25% by weight soluble Fe.

19. The product of the method of claim 18.

* * * * *

UNITED STATES PATENT AND TRADEMARK OFFICE
CERTIFICATE OF CORRECTION

PATENT NO. : 5,108,481
DATED : April 28, 1992
INVENTOR(S) : THOMAS C. SHUTT

It is certified that error appears in the above-identified patent and that said Letters Patent is hereby corrected as shown below:

At column 3, line 6, after "(e.g" please insert --.--.

At column 6, line 42, after "formed" insert --.--.

At column 7, line 58, after "4.8" insert the following paragraph:
--C) % by weight soluble Fe=30.8--

At column 10, line 31, delete "pelletizing" and insert therefor --pelletized--.

Signed and Sealed this

Sixth Day of July, 1993

Attest:

MICHAEL K. KIRK

Attesting Officer

Acting Commissioner of Patents and Trademarks